(12) United States Patent
Shimizu

(10) Patent No.: US 7,247,380 B2
(45) Date of Patent: Jul. 24, 2007

(54) LAMINATED PHASE RETARDER FILM AND A LIQUID CRYSTAL DISPLAY USING THE SAME

(75) Inventor: Akiko Shimizu, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 72 days.

(21) Appl. No.: 10/435,035

(22) Filed: May 12, 2003

(65) Prior Publication Data
US 2003/0219549 A1 Nov. 27, 2003

(30) Foreign Application Priority Data
May 13, 2002 (JP) ............................. 2002-136587

(51) Int. Cl.
*B32B 18/00* (2006.01)
*B32B 27/32* (2006.01)
*B32B 27/36* (2006.01)
*G02F 1/1335* (2006.01)
*G02B 5/30* (2006.01)

(52) U.S. Cl. .................. 428/412; 428/323; 428/325; 428/446; 428/451; 428/452; 428/454; 428/697; 428/701; 428/702; 349/117; 349/118; 359/494; 359/500

(58) Field of Classification Search ............... None
See application file for complete search history.

(56) References Cited

U.S. PATENT DOCUMENTS

| | | | |
|---|---|---|---|
| 5,196,953 A | | 3/1993 | Yeh et al. |
| 5,366,682 A | * | 11/1994 | Morikawa et al. .......... 264/230 |
| 5,430,566 A | * | 7/1995 | Sakaya et al. .............. 349/118 |
| 5,474,731 A | * | 12/1995 | Morikawa et al. .......... 264/230 |
| 5,478,518 A | * | 12/1995 | Taketani et al. ............ 264/216 |
| 5,480,964 A | | 1/1996 | Harris et al. |
| 5,580,950 A | | 12/1996 | Harris et al. |
| 5,631,755 A | * | 5/1997 | Sakaya et al. .............. 349/117 |
| 5,658,505 A | | 8/1997 | Shimizu et al. |
| 5,688,436 A | * | 11/1997 | Ohnishi et al. ......... 252/299.01 |
| 5,693,253 A | * | 12/1997 | Ohnishi et al. ......... 252/299.01 |
| 5,888,634 A | | 3/1999 | Shimizu et al. |
| 5,926,313 A | * | 7/1999 | Hishinuma et al. ......... 359/486 |
| 6,060,183 A | * | 5/2000 | Higashi et al. ............. 428/701 |
| 6,097,460 A | * | 8/2000 | Shimizu et al. ............. 349/117 |
| 6,281,956 B1 | | 8/2001 | Ohmuro et al. |
| 6,512,561 B1 | | 1/2003 | Terashita et al. |
| 6,661,488 B1 | | 12/2003 | Takeda et al. |
| 6,724,452 B1 | | 4/2004 | Takeda et al. |
| 2002/0039159 A1 | | 4/2002 | Yano et al. |
| 2002/0048639 A1 | | 4/2002 | Negoro et al. |
| 2003/0048396 A1* | | 3/2003 | Ishii et al. ..................... 349/96 |
| 2003/0049459 A1* | | 3/2003 | Ishii et al. ................. 428/423.1 |
| 2003/0058393 A1 | | 3/2003 | Terashita et al. |
| 2004/0119924 A1 | | 6/2004 | Takeda et al. |
| 2004/0252264 A1* | | 12/2004 | Shimizu ...................... 349/117 |

FOREIGN PATENT DOCUMENTS

| | | |
|---|---|---|
| EP | 0 816 900 A2 * | 1/1998 |
| EP | 0816900 A2 | 7/1998 |
| JP | 5-196819 A | 8/1993 |
| JP | 05-249457 A | 9/1993 |
| JP | 07-253573 A | 10/1995 |
| JP | 8-62422 A | 3/1996 |
| JP | 08-511812 A | 12/1996 |
| JP | 10-104428 * | 4/1998 |
| JP | 10-104428 A | 4/1998 |
| JP | 10-153802 A | 6/1998 |
| JP | 11-095030 * | 4/1999 |
| JP | 11-095208 * | 4/1999 |
| JP | 11-95208 A | 4/1999 |
| JP | 11-095208 A | 4/1999 |
| JP | 11-133413 A | 5/1999 |
| JP | 11-258605 A | 9/1999 |
| JP | 2001-27707 A | 1/2001 |
| JP | 2001-272538 * | 10/2001 |
| JP | 2001-272538 A | 10/2001 |
| JP | 2002/098836 A | 4/2002 |
| JP | 2002-107541 * | 4/2002 |
| JP | 2002-107541 A | 4/2002 |
| WO | WO 94/24191 A1 | 10/1994 |
| WO | WO 96/11967 A1 | 4/1996 |

OTHER PUBLICATIONS

English translation of Chinese Office Action dated Jan. 4, 2005.
English translation of Chinese Office Action dated Sep. 6, 2005.
English translation of Japanese Office Action mailed Aug. 1, 2006.

* cited by examiner

*Primary Examiner*—Vivian Chen
(74) *Attorney, Agent, or Firm*—Sughrue Mion, PLLC

(57) ABSTRACT

The objective of the present invention is to provide a laminated phase retarder film that is superior in evenness, exhibits a biaxial optical property as a whole, and makes it possible to set the biaxial optical property over a wide range. This object is achieved by a laminated phase retarder film comprising a transparent resin film as a substrate and at least one coat layer having a refractive-index anisotropy laminated on at least one surface of the substrate, wherein a in-plane retardation value ($R_0$) is not less than 20 nm, a retardation value (R') in the film-thickness direction, which is calculated from a retardation value ($R_{40}$) measured by inclining by 40 degrees around the slow axis of the film and the in-plane retardation value ($R_0$), is greater than 40 nm.

7 Claims, No Drawings

LAMINATED PHASE RETARDER FILM AND A LIQUID CRYSTAL DISPLAY USING THE SAME

FIELD OF THE INVENTION

The present invention relates to a laminated phase retarder film that is used for improving viewing angle of a liquid crystal display. The present invention also relates to a liquid crystal display comprising the laminated phase retarder film.

BACKGROUND OF THE INVENTION

Liquid crystal displays (hereinafter, referred to as LCDs) have been widely used as flat-panel displays ranging from small-size devices to those having a large display capacity. However, these LCDs have the viewing angle characteristics that the display characteristic becomes bad, when it sees from an angle; for example, contrast falls or glay-scale inversion which brightness reverses within glay-scale occurs. Therefore, there have been strong demands for solving these problems.

Recently, with respect to an LCD system for improving these viewing-angle characteristics, a vertically aligned nematic type liquid crystal display (hereinafter, referred to as VA-LCD) has been developed, for example, as disclosed in Japanese Patent No. 2548979. As described at pages from 845 to 848 in SID 97 DIGEST, it has been known that the VA-LCD has an arrangement in which two negative uniaxial phase retarder films having optical axes in a direction perpendicular to the film surface are placed above and below liquid crystal cells so that it becomes possible to provide a characteristics of a wider viewing-angle, and in this LCD, a uniaxially oriented phase retarder film having a positive refractive index anisotropy having an in-plane retardation value of 50 nm is used so that a characteristics of wider viewing-angle can be achieved. A phase retarder plate in which a negative uniaxial orientation phase retarder film having an optical axis in a direction perpendicular to the film surface and a uniaxial orientation phase retarder film having a positive refractive index anisotropy are combined to provide the same optical properties as a biaxial orientation phase retarder film as a whole.

Moreover, in addition to VA-LCDs, for example, it has been know that a method in which a biaxially oriented phase retarder film is used in a 90-degree twisted nematic liquid crystal display so as to improve the viewing angle. It has been known that the biaxially oriented phase retarder film is obtained by biaxially drawing a film made from a thermoplastic polymer. With respect to an apparatus to be used for the biaxial orientation, an experimental apparatus which can biaxially draw a piece of film or a simultaneous biaxially drawing machine which has been conventionally used for producing packaging films and the like have been known; however, in the experimental apparatus, it is difficult to produce a large amount of phase retarder films that are sufficiently large films adequate to LCDs; in contrast, the simultaneous biaxially drawing machine can not achieve evenness in the retardation value that is sufficiently applied to the LCD, evenness in the slow axis direction and surface properties (without scratches) in a large area. Moreover, when a conventional drawing machine for producing phase retarder films used for LCD is used, although sufficient evenness is obtained in a large area, the resulting optical properties only have a very limited range in its biaxial orientation.

SUMMARY OF THE INVENTION

The inventor of the present invention have studied extensively to solve the above-mentioned problems, and consequently developed a laminated phase retarder film comprising a transparent resin film as a substrate and at least one coat layer having a refractive-index anisotropy laminated on at least one surface of the substrate, wherein a in-plane retardation value has a specific value, and a retardation value in the film-thickness direction, which is calculated from a retardation value measured by inclining by 40 degrees around the slow axis of the film and the in-plane retardation value, has a specific value; thus, it becomes possible to obtain desirable optical properties, and consequently to achieve the present invention.

Therefore, one objective of the present invention is to provide a laminated phase retarder film that is superior in evenness, exhibits a biaxial orienting property as a whole, and makes it possible to set the biaxial orienting optical property over a wide range. Another objective of the present invention is to provide a laminated phase retarder film exhibiting the optical properties evenly over a wider area. The other objective of the present invention is to provide a liquid crystal display which has an improved viewing angle by using such a laminated phase retarder film.

Accordingly, the present invention provides a laminated phase retarder film comprising a transparent resin film as a substrate and at least one coat layer having a refractive-index anisotropy laminated on at least one surface of the substrate, wherein a in-plane retardation value ($R_O$) is not less than 20 nm, a retardation value (R') in the film-thickness direction, which is calculated from a retardation value ($R_{40}$) measured by inclining by 40 degrees around the slow axis within the film plane and the in-plane retardation value ($R_O$), is greater than 40 nm.

In the above-mentioned laminated phase retarder film, the coat layer having the refractive-index anisotropy may comprise, for example, a liquid crystalline composition or a material obtained by curing a liquid crystalline composition. Moreover, the coat layer may comprise a layer containing an organic clay compound that may be dispersed in an organic solvent. Additionally, this coat layer may comprise homopolymer of polyimide prepared from a solution of soluble polyimide or a layer comprising a rigid-rod like polymer derived from polyamide, polyester, poly(amide-imide), or poly(ester-imide), which exhibits a negative refractive-index anisotropy. Furthermore, this coat layer may comprise a multi-layered thin membrane that is formed by alternately stacking layers composed of materials having different refractive indexes.

This laminated phase retarder film may be effectively applied so as to improve viewing-angle characteristics of a liquid crystal display. Therefore, the present invention also provides a liquid crystal display comprising at least one sheet of the above-mentioned laminated phase retarder film and liquid crystal cells.

DETAILED DESCRIPTION OF THE PRESENT INVENTION

A transparent resin film to be used as a substrate of a laminated phase retarder film of the present invention is preferably oriented within the film plane, and the in-plane retardation value (indicated as $R_{OB}$) is preferably not less than 20 nm. Moreover, in an attempt to effectively compensate for viewing angles of a VA-LCD and a twisted nematic liquid crystal display that is driven by thin-film transistors (TFT-TN-LCD), and the like, the in-plane retardation value ($R_{OB}$) of the substrate may sometimes need to be from 20 to 160 nm, or 250 to 300 nm which is near λ/2 of visible light.

The transparent resin film of the substrate, for examples, may include polycarbonate resins, cyclic polyolefin resins, or cellulose resins. When this is used for a viewing-angle compensating film for a large-size LCD of not less than 14 inches, upon exposure to a high temperature while being placed between a liquid crystal cell and a polarizer by using adhesive, the retardation value might deviate due to a stress generated by heat, or the retardation value might become lacking of uniformity due to deviations in a stress generated by backlight heat in the case of a transmission-type liquid crystal display, resulting in a reduction in the contrast and irregularities in display. Upon application under conditions having such a stress imposed thereon, it is preferable to use a modified or copolymer polycarbonate resins, cyclic polyolefin resins or cellulose resins having an absolute value of modulus of photo-elasticity of not more than $10 \times 10^{-13} cm^2/$dyne so as to prevent degradation in evenness in the retardation value.

The preferable transparent resin films are films produced by preparing a film by a method of solvent casting method, method of a precision extruding method having a low residual stress and the like, and orienting the obtained film through a drawing process or the like so as to give necessary optical properties. In the above film-forming process, it is preferable to use the solvent casting method in which the above-mentioned resin is dissolved in an appropriate solvent, and the resulting solution is poured onto a stainless steel belt, or a drum, or a mold-releasing film (such as polyethylene terephthalate) so as to be drawn thereon, and after having been dried, the resulting product is separated from the belt, drum or mold-releasing film so as to be formed into a film, from the viewpoint that it becomes possible to obtain a film having superior evenness in thickness.

The method of the drawing and orienting process may include, for example, methods in which a film obtained by the solvent casting method is oriented by the method of lateral uniaxial orientation with a tenter, the method of a low-magnification roll-to-roll longitudinal uniaxial orientation and the like, and in which, upon producing a film by the solvent casting method, during a process for separating from a belt, a drum or a mold-releasing film, or during a drying process, a slight tension is applied so as to carry out a uniaxial orienting process in the film-forming direction. In the case when a value of about not less than 100 nm is required as the in-plane retardation value ($R_0$) of the laminated phase retarder film, methods in which a film is oriented by the method of lateral uniaxial orientation with a tenter and the method of a low-magnification roll-to-roll longitudinal uniaxial orientation are preferably used. In contrast, in the case where a relatively small value, such as about 20 nm to about 100 nm, is required as $R_0$, a method in which a uniaxial drawing process is carried out upon casting a solvent for the film or upon taking up the film after the extrusion process is preferably used. The orientation provided by the drawing process is determined by a required in-plane retardation value ($R_{OB}$); therefore, it may have either a uniaxial orientation or a biaxial orientation to a degree provided by the method of lateral orientation with tenter.

In the laminated phase retarder film of the present invention, a coat layer having a refractive-index anisotropy is laminated on a transparent resin film as a substrate so that the entire film exhibit a biaxial orienting property as a whole. In preferable modes, the transparent resin film as the substrate have an in-plane retardation, and a coat layer having a negative refractive-index anisotropy in the thickness direction is further laminated thereon so that, by compensating for insufficiency in the biaxial orienting property, the film exhibits a biaxial orienting property as a whole.

With respect to the coat layer having a refractive-index anisotropy, not particularly limited, any layer may be used as long as it exhibits a negative refractive-index anisotropy in the thickness direction, and, for example, the following layers may be used:

A layer comprising a liquid crystalline compound or a material obtained by curing a liquid crystalline compound;

A layer comprising at least one kind of organic clay compound that may be dispersed in an organic solvent, as disclosed in Japanese Patent No. 10-104428A;

A layer comprising homo-polymer of polyimide prepared from a solution of soluble polyimide, as disclosed in WO94/24191.

A layer comprising a rigid-rod like polymer derived from polyamide, polyester, poly(amide-imide), or poly(ester-imide), which exhibits a negative refractive-index anisotropy as disclosed in No. WO96/11967.

A layer comprising a multilayer thin film that is formed by alternately stacking layers composed of materials having different refractive indexes, as disclosed in U.S. Pat. No. 5,196,953.

In the case where the layer comprising a liquid crystalline compound or a material obtained by curing a liquid crystalline compound is used as the coat layer, the liquid crystalline compound needs to be oriented so as to exhibit a negative refractive-index anisotropy in the thickness direction. The mode of orientation is different depending on the kind of the liquid crystalline compound to be used, for example, in the case of the application of a discotic liquid crystalline compound, the homeotropic orientation with a disc face facing up is preferably used, and in the case of the application of a rod-shape nematic liquid crystalline compound, the super twisted orientation having a twist of not less than 270 degree or the like is preferably used, from the viewpoint of preparing a negative refractive-index anisotropy in the thickness direction. Alternatively, a liquid crystal layer having a homogeneous orientation which has an in-plane slow axis direction in a direction orthogonal to the slow axis of an in-plane refractive-index anisotropy that belongs to a transparent resin film to be used in the substrate or a hybrid orientation is superposed so that it becomes possible to obtain necessary optical properties. With respect to the method for orienting the liquid crystalline compound, not particularly limited, general methods, such as the application of an alignment layer, rubbing, addition of a chiral dopant and light irradiation, may be adopted. Moreover, after the liquid crystalline compound has been oriented, the liquid crystalline compound may be cured so that the orientation is fixed, or the liquid crystalline properties may be maintained to provide functions such as temperature compensation.

In the case when a layer comprising at least one kind of organic clay compound that may be dispersed in an organic solvent, for example, disclosed in Japanese Patent No. 10-104428A, is used as the coat layer, if the substrate on which a coat layer is formed is plane, the layer of unit crystal of the organic clay compound is oriented parallel to the plane, and randomly oriented in the in-plane direction, with respect to the substrate plane. Therefore, without the additional specific orienting process, it is possible to provide a refractive-index structure in which the film in-plane refractive index is greater than the refractive index in the film thickness direction.

As disclosed in the above-mentioned Japanese Patent No. 10-104428A, the organic clay compound is a composite material between an organic substance and a clay mineral, and more specifically, is prepared as, for example, a composite material between a clay mineral having a layered structure and an organic compound. With respect to the clay mineral having a layered structure, examples thereof include smectite materials and swellable mica, and these may be combined with an organic compound through the cation exchanging function thereof. Among these, the smectite materials are also superior in transparency, and preferably used. With respect to the smectite materials, examples thereof include: hectorite, montmorillonite and bentonite, and substituted materials, derivatives and mixtures of these. Among these, those that have been chemically synthesized are preferably used from the viewpoint of free from impurities and have superior transparency. In particular, the synthesized hectorite of which particle size is controlled to a small level make it possible to reduce scattering of visible light rays, and are preferably used. With respect to the organic compound that is combined with a clay mineral, examples thereof include compounds that can react with oxygen atoms and hydroxyl groups in the clay mineral and ionic compounds that can be ion-exchanged by exchangeable cations, and not particularly limited, any compound may be used as long as the organic clay compound to be swelled or dispersed in the organic solvent; and a specific example is a nitrogen-containing compound and the like. The nitrogen-containing compound may include, for examples, primary, secondary and tertiary amines, quaternary ammonium compounds, urea and hydrazine. Among these, quaternary ammonium compounds are preferably used, from the viewpoint that these compounds make it possible to easily carry out cation exchanges.

Such an organic clay compound that may be dispersed in an organic solvent is preferably used in combination with a hydrophobic resin from the viewpoint of ease of formation of a coat layer on a substrate, the expression of optical properties and mechanical properties. With respect to the hydrophobic resin to be used in combination with the organic clay compound, those resins that are dissolved in an organic solvent with low polarity, such as benzene, toluene and xylene, are preferably used. Moreover, in order to obtain superior humidity and heat resistant property and handling property required for the laminated phase retarder film to be applied to a large-size liquid crystal display of not less than 15 inches, those materials having a high hydrophobic property and a strong adhesive property to the transparent resin substrate are preferably used. With respect to the preferable hydrophobic resins, examples thereof include polyvinyl acetal resins such as polyvinyl butyral and polyvinyl formal, cellulose resins, such as cellulose acetate butyrate, acrylic resins and methacrylic resins. In particular, most preferable resins are butyl acrylate resins and dicyclopentanyl methacrylic resins. These resins preliminarily polymerized may be used, or these resins may be polymerized by using a monomer or an oligomer through a thermosetting or ultra-violet-ray-setting method during film-forming processes. Moreover, a plurality of these resins may be used in a mixed manner.

With respect to the rate of the organic clay compound that may be dispersed in an organic solvent and the hydrophobic resin is preferably a range of 1:2 to 10:1 in the weight ratio of the former:the latter, from the viewpoint of improvements in the mechanical characteristics such as prevention of cracks in the layer comprising the organic clay compound and the hydrophobic resin. The organic clay compound is applied to a substrate of a transparent resin film, while being dispersed in an organic solvent. In the case where a hydrophobic resin is simultaneously used, this hydrophobic resin is also dispersed or dissolved in the organic solvent. The solid-component concentration of this dispersion solution is not particularly limited as long as the range does not allow the dispersion solution after preparation to become gel or cloudy for several days. The total solid-component concentration of the organic clay compound and the hydrophobic resin is usually in a range of about 3 to about 15% by weight. The optimal solid component concentration differs depending on the respective kinds of the organic clay compound and the hydrophobic resin and the composition ratio of the two materials; therefore, it is set for each of the compositions. Moreover, various additives, such as a viscosity-adjusting agent for improving the coating property upon forming a film on the substrate and a cross-linking agent for further improving the hydrophobic property and/or durability, may be added thereto.

With respect to the coat layer, a layer, which comprises homopolymer of polyimide produced from the solution of soluble polyimide as disclosed in WO94/24191, may be used, or a layer, which comprises a rigid rod polymer made from polyamide, polyester, poly(amide-imide) or poly(ester-imide) that exhibit a negative refractive-index anisotropy, as disclosed in WO96/11967, may be used as well. When cast over the film as substrate, each of these soluble polymers has its main chains aligned in parallel with the substrate film surface through its self-orienting process so that it is allowed to exhibit a negative refractive-index anisotropy; therefore, it is possible to adjust the degree of the refractive-index anisotropy by changing the linearity and rigidity of the main chains, in addition to a method for changing the thickness of the coat layer.

In the case where a layer, comprising multi-layer thin film formed by alternately stacking materials having different refractive indexes is used as the coat layer, as disclosed in U.S. Pat. No. 5,196,953, is used as the coat layer, the thicknesses of the respective layers and the refractive indexes of the respective layers are designed in accordance with the disclosure of the specification of this U.S. Patent so as to obtain a necessary negative refractive index anisotropy.

In the present invention, a phase retarder film is produced by laminating a coat layer having a refractive-index anisotropy on the substrate made of a transparent resin film, as described above, and in order to further strengthen the adhesive property between the coat layer having a refractive-index anisotropy and the transparent substrate, a primer layer may be formed on the transparent substrate, or the transparent substrate may be subjected to a surface treatment. With respect to the primer layer, not particularly limited, any coat layer may be used, as long as it allows the coat layer having a refractive-index anisotropy to be evenly applied to the substrate, and makes it possible to improve the adhesive strength; and, for example, resins such as urethane resins, acrylic resins and methacrylic resins may be used. With respect to the method for the surface treatment, not particularly limited, any method may be used as long as it allows the coat layer having a refractive-index anisotropy to be evenly applied to the substrate, and makes it possible to improve the adhesive strength; and, for example, a corona treatment may be used.

With respect to the method for forming the coat layer having a refractive-index anisotropy on the transparent resin substrate and the method in which a primer layer is formed on the transparent resin substrate, not particularly limited, any one of various conventional coat methods, such as a direct gravure method, a reverse gravure method, a dye coat method, a comma coat method and a bar coat method, may be used. Among these, the comma coat method and the dye coat method without using a backup roll are preferably used from the viewpoint of superior thickness precision.

The thickness of the coat layer may not be limited as long as it provides optical properties required for the laminated phase retarder film as a whole in a manner so as to be combined with the optical properties of the transparent resin film, in particular, biaxial characteristics. In other words, with respect to the optical properties finally required for the phase retarder film, the thickness of the coat layer is properly selected so as to provide optical properties that can sufficiently compensate for lacking portions in the optical properties of the transparent resin film.

The biaxial property and the refractive-index anisotropy in the thickness direction required for the laminated phase retarder film differ depending on applications thereof. The biaxial property and the refractive-index anisotropy in the thickness direction are represented by the retardation value (R') in the film thickness direction defined by the following equation (I), and this value is calculated from a retardation value ($R_{40}$) measured by inclining by 40 degrees around the slow axis and the in-plane retardation value ($R_0$) of the film.

$$R' = [(n_x + n_y)/2 - n_z] \times d \quad (I)$$

where $n_x$: refractive index in the slow axis direction within the film plane;

$n_y$: refractive index in the direction perpendicular to $n_x$ within the film plane;

$n_z$: refractive index in the film thickness direction;

d: film thickness

For example, the in-plane retardation value ($R_O$) of the laminated phase retarder film can be set in a range of about 20 to about 300 nm, and the retardation value (R') in the film thickness direction is desirably set in a range of about 50 to about 1200 nm. More preferably, the retardation value (R') in the film thickness direction is set in a range of about 50 to about 300 nm. More specifically, in order to effectively compensate for the viewing angle of VA-LCD, TFT-TN-LCD and the like, the in-plane retardation value ($R_O$) of the laminated phase retarder film is preferably set in a range of 20 to 160 nm, or 250 to 300 nm in the vicinity of one-half the wavelength of visible light. When the in-plane retardation value ($R_O$) of the laminated phase retarder film is set in a range of 20 to 160 nm, the retardation value (R') in its thickness direction is preferably set in a range of 50 to 300 nm; moreover, when the in-plane retardation value ($R_O$) of the laminated phase retarder film is set in a range of 250 to 300 nm in the vicinity of λ/2 of visible light, the retardation value (R') in its thickness direction is preferably set in a range of 500 to 1200 nm.

Upon application of the laminated phase retarder film of the present invention to an LCD, at least one sheet of the laminated phase retarder film is used with liquid crystal cells. Moreover, the laminated phase retarder film, which is laminated with a polarizing film, may be used with liquid crystal cells. When the laminated phase retarder film is laminated with a polarizing film or liquid crystal cells, adhesive of an acrylic type and the like may be used. The thickness of the adhesive is usually set in a range of about 15 to 30 μm. With respect to laminating processes to an LCD, the laminated phase retarder film may be disposed between a polarizing film on one side and liquid crystal cells, or in the case where, upon placing collectively on one side, resulting in the film thickness becoming too thick to make the laminating process difficult, the laminated phase retarder film may be disposed between either an upper or lower polarizing film and liquid crystal cells in a divided manner, as long as the laminating process does not impair the display characteristics of the LCD. Moreover, with respect to the lamination order onto the LCD as to whether the coat layer side of the laminated phase retarder film or the substrate side of the transparent resin film is allowed to face the liquid crystal cell side, it is determined so as to optimize characteristics of the LCD such as a viewing angle.

EXAMPLES

The following description will discuss the present invention in detail by reference to examples; however, the present invention is not intended to be limited by these examples. In the following examples, % indicating the content or the amount of use is on a weight basis unless otherwise indicated. The materials to be used in the formation of a coat layer in the following examples are listed below.

(A) Organic Clay Compound

Brand name "LUCENTITE STN": made by Co-op CHEMICAL CO., Ltd, which is composed of synthesized hectorite and a quaternary ammonium compound, and has a superior dispersing property in a high-polarity solvent.

Brand name "LUCENTITE SPN": made by Co-op CHEMICAL Co., Ltd, which is composed of synthesized hectorite and a quaternary ammonium compound, and has a superior dispersing property in a non-polarity solvent.

(B) Hydrophobic Resin

Brand name "Denka Butyral #3000-K": made by Denki Kagaku Kogyo CO., LTD., which is an aldehyde modified resin of polyvinyl alcohol.

Brand name "ARON S1601": made by TOAGOSEI CO., LTD., which is an acrylic resin mainly composed of butylacrylate.

Brand name "Vanaresin MKV-115": made by Shin-Nakamura Chemical Co., Ltd., which is a methacrylic resin mainly composed of dicyclopentanyl methacrylate.

Moreover, measurements of physical values and evaluation of the sample were carried out by the following methods:

(1) In-plane Retardation Value ($R_O$)

This value is measured by using monochromatic light having a wavelength of 559 nm through a rotary analyzer method using a "KOBRA-21ADH" made by OJI SCIENTIFIC INSTRUMENTS Ltd.

(2) Retardation Value (R') in the Film Thickness Direction

By using $R_0$, the retardation value ($R_{40}$) measured by inclining by 40 degrees around the slow axis, the thickness (d) of the phase retarder film and the average refractive index ($n_0$) of the phase retarder film, $n_x$, $n_y$, and $n_z$ are found through computer numeric value calculations through the following equations (II) to (IV), and based upon equation (I), the retardation value (R') in the thickness direction is then calculated. Here, it is supposed that the in-plane retardation value of the substrate film is $R_{OB}$, the retardation value in the thickness direction of the substrate film is $R'_B$, the in-plane retardation value of the coat layer is $R_{OC}$, the retardation value in the thickness direction of the substrate film is $R'_C$, the in-plane retardation value of the entire laminated phase retarder film is $R_O$ and the retardation value in the thickness direction of the entire laminated phase retarder film is R'.

$$R' = [(n_x+n_y)/2 - n_z] \times d \quad (I)$$

$$R_O = (n_x \times n_y) \times d \quad (II)$$

$$R_{40} = (n_x - n_y') \times d/\cos(\phi) \quad (III)$$

$$(n_x+n_y+n_z)/3 = n_0 \quad (IV)$$

wherein $$\phi = \sin^{-1}[\sin(40°)/n_0]$$

$$n_y' = n_y \times n_z / [n_y^2 \times \sin^2(\phi) + n_z^2 \times \cos^2(\phi)]^{1/2}$$

Example 1

A triacetyl cellulose film ("KONICA TAC KC80CA"; brand name made by KONICA CORPORATION) having a thickness of 80 μm was drawn by a roll-to-roll longitudinal uniaxial orientation method to obtain a substrate film having $R_{OB}$=25 nm and $R'_B$=56 nm. To this substrate film was continuously applied by using a comma coater an organic solvent dispersion solution containing 2.50% of an aldehyde modified resin of polyvinyl alcohol "Denka Butyral #3000-K", 5.63% of an organic clay compound "LUCENTITE STN", 1.87% of an organic clay compound "LUCENTITE SPN", 63.0% of toluene, 18.0% of methylene chloride and 9.0% of acetone so that the film thickness after drying was set to 10 μm; thus, a coat layer having $R_{OC}$=0 nm and $R'_C$=122 nm was laminated thereon. The laminated phase retarder film, thus obtained, had optical properties of $R_O$=25 nm and R'=178 nm.

Example 2

The same triacetyl cellulose film having a thickness of 80 μm as example 1 was drawn by a roll-to-roll longitudinal uniaxial orientation method to obtain a substrate film having $R_{OB}$=22 nm and $R'_B$=40 nm. To this substrate film was continuously applied by using a comma coater an organic solvent dispersion solution containing the resin and the organic clay compound having the same compositions as those used in example 1 so that the film thickness after drying was set to 6.2 μm; thus, a coat layer having $R_{OC}$=0 nm and $R'_C$=95 nm was laminated thereon. The laminated phase retarder film, thus obtained, had optical properties of $R_O$=22 nm and R'=135 nm.

Example 3

A cellulose-modified polymer film having a thickness of 120 μm was drawn by a roll-to-roll longitudinal uniaxial orientation method to obtain a substrate film having $R_{OB}$=40 nm and $R'_B$=130 nm. The film surface of this substrate was subjected to a corona treatment under conditions of 70 W/m²/min, and to this was continuously applied by using a comma coater an organic solvent dispersion solution containing 1.5% of an acrylic resin "ARON S1601", 1.5% of a methacrylic resin "Vanaresin MKV-115", 6.75% of an organic clay compound "LUCENTITE STN", 2.25% of an organic clay compound "LUCENTITE SPN", 70.4% of toluene and 17.6% of methylene chloride so that the film thickness after drying was set to 7.5 μm; thus, a coat layer having $R_{OC}$=0 nm and $R'_C$=80 nm was laminated thereon. The laminated phase retarder film, thus obtained, had optical properties of $R_O$=40 nm and R'=220 nm.

Example 4

A cellulose-modified polymer film having a thickness of 120 μm was drawn by a roll-to-roll longitudinal uniaxial orientation method to obtain a substrate film having $R_{OB}$=60 nm and $R'_B$=130 nm. The film surface of this substrate was subjected to a corona treatment under conditions of 70 W/m²/min, and to this was continuously applied by using a comma coater an organic solvent dispersion solution containing the resin and the organic clay compound having the same compositions as those used in example 3 SO that the film thickness after drying was set to 6.6 μm; thus, a coat layer having $R_{OC}$=0 nm and $R'_C$=64 nm was laminated thereon. The laminated phase retarder film, thus obtained, had optical properties of $R_O$=60 nm and R'=194 nm.

Example 5

A cellulose-modified polymer film having a thickness of 100 μm was drawn by a roll-to-roll longitudinal uniaxial orientation method to obtain a substrate film having $R_{OB}$=50 nm and $R'_B$=90 nm. The film surface of this substrate was subjected to a corona treatment under conditions of 70 W/m²/min, and to this was continuously applied by using a comma coater an organic solvent dispersion solution containing the resin and the organic clay compound having the same compositions as those used in example 3 so that the film thickness after drying was set to 8 μm; thus, a coat layer having $R_{OC}$=0 nm and $R'_C$=115 nm was laminated thereon. The laminated phase retarder film, thus obtained, had optical properties of $R_O$=50 nm and R'=205 nm.

Example 6

The surface of a cellulose-modified polymer cast film ($R_{OB}$=16 nm and $R'_B$=71 nm) having a thickness of 160 μm, which had been formed by a solvent casting process and slightly extended in a film forming direction in a separating process and a drying process after casting, was subjected to a corona treatment under conditions of 70 W/m²/min, and to this was continuously applied by using a dye coater an organic solvent dispersion solution containing the resin and the organic clay compound having the same compositions as those used in example 1 so that the film thickness after drying was set to 10 μm; thus, a coat layer having $R_{OC}$=0 nm and $R'_C$=122 nm was laminated thereon. The laminated phase retarder film, thus obtained, had optical properties of $R_O$=16 nm and R'=193 nm.

Example 7

A cyclic polyolefin-based resin film ("ARTON"; brand name, made by JSR Corporation) having a thickness of 100 μm is drawn by a roll-to-roll longitudinal uniaxial orientation method to obtain a substrate film having $R_{OB}$=280 nm and $R'_B$=140 nm. The film surface of this substrate is subjected to a corona treatment under conditions of 70 W/m²/min, and to this is continuously applied by using a comma coater an organic solvent dispersion solution containing the resin and the organic clay compound having the same compositions as those used in example 3 so that the film thickness after drying is set to 38 μm; thus, a coat layer having $R_{OC}$=0 nm and $R'_C$=630 nm is laminated thereon. The laminated phase retarder-film, thus obtained, has optical properties of $R_0$=280 nm and R'=770 m.

In accordance with the present invention, it becomes possible to easily manufacture a biaxial phase retarder film which has a large area that has not been achieved by conventional methods, is superior in evenness and also has a wider set range in optical properties, and consequently to improve the viewing angle of an LCD.

What is claimed is:

1. A laminated phase retarder film comprising a transparent resin film as a substrate and at least one coat layer having a refractive-index anisotropy laminated on at least one surface of the substrate, wherein an in-plane retardation value ($R_0$) is more than 50 nm, a retardation value (R') in the film-thickness direction, which is calculated from a retardation value ($R_{40}$) measured by inclining by 40 degrees around the slow axis of the film and the in-plane retardation value ($R_0$), is greater than 40 nm, and wherein the coat layer having a refractive-index anisotropy comprises at least one kind of an organic clay compound which can be dispersed in an organic solvent.

2. The laminated phase retarder film according to claim 1, wherein the transparent resin film as a substrate is oriented within the film plane, and the in-plane retardation value ($R_{OB}$) is not less than 20 nm.

3. The laminated phase retarder film according to claim 1, wherein the transparent resin film as a substrate comprises one selected from the group consisting of polycarbonate resins, cyclic polyolefin resins, and cellulose resins.

4. The laminated phase retarder film according to claim 1, wherein the in-plane retardation value ($R_0$) is between 50 nm and 300 nm, and the retardation value (R') in the film-thickness direction, which is calculated from a retardation value ($R_{40}$) measured by inclining by 40 degrees around the slow axis of the film and the in-plane retardation value ($R_0$), is from 50 nm to 300 nm.

5. A liquid crystal display comprising at least one sheet of the laminated phase retarder film according to claim 1, and liquid crystal cells.

6. The laminated phase retarder film according to claim 1, wherein the in-plane retardation value ($R_0$) is not less than 60 nm.

7. The laminated phase retarder film according to claim 1, wherein the in-plane retardation value ($R_0$) is from 60 nm to 300 nm.

* * * * *